US010374408B2

(12) United States Patent
Meyers

(10) Patent No.: US 10,374,408 B2
(45) Date of Patent: Aug. 6, 2019

(54) ELECTRICAL GROUND ROD CAP

(71) Applicant: Allen Meyers, Omaha, NE (US)

(72) Inventor: Allen Meyers, Omaha, NE (US)

( * ) Notice: Subject to any disclaimer, the term of this patent is extended or adjusted under 35 U.S.C. 154(b) by 519 days.

(21) Appl. No.: 14/527,244

(22) Filed: Oct. 29, 2014

(65) Prior Publication Data

US 2015/0053451 A1 Feb. 26, 2015

Related U.S. Application Data

(63) Continuation-in-part of application No. 13/367,368, filed on Feb. 6, 2012, now Pat. No. 8,901,424.

(60) Provisional application No. 61/439,561, filed on Feb. 4, 2011.

(51) Int. Cl.
*H02G 15/06* (2006.01)
*H02G 13/00* (2006.01)

(52) U.S. Cl.
CPC ............ *H02G 15/06* (2013.01); *H02G 13/40* (2013.01)

(58) Field of Classification Search
CPC ... B60R 16/0207; H01B 7/0045; H01L 24/10; H05K 2201/0367; H02G 15/06; H02G 15/076; H02G 3/088; H02G 3/16; H02G 15/113; H02G 15/04; H02G 15/18
See application file for complete search history.

(56) References Cited

U.S. PATENT DOCUMENTS 937,130 A 10/1909 Williams
3,446,910 A 5/1969 Curtiss et al.
4,421,945 A 12/1983 Moisson
4,536,611 A * 8/1985 Butler ................. H02G 15/117 174/41
4,558,174 A 12/1985 Massey
4,795,857 A 1/1989 McInnis
D330,792 S * 11/1992 Colley ......................... D13/156
5,494,462 A 2/1996 Auclair
5,503,575 A 4/1996 Ciampini
5,674,089 A * 10/1997 Sampson .............. H02G 15/18 439/521
5,864,093 A 1/1999 Hecock et al.
6,137,049 A 10/2000 Hecock
6,553,911 B1 4/2003 Walker et al.
7,273,984 B2 * 9/2007 Murphy ............ H01R 13/5213 174/92
7,287,990 B1 10/2007 Collier et al.
(Continued)

*Primary Examiner* — Pete T Lee

(74) *Attorney, Agent, or Firm* — Kutak Rock LLP; Bryan P. Stanley

(57) ABSTRACT

A ground rod cap is provided. The cap includes a body that fits around a ground rod, ground rod clamp and ground wire at their point of connection. The body retains a filler material within an internal cavity. In some embodiments, a portion of the body acts as a barrier to retain the filler material. In some such embodiments, the filler material is positioned within the body prior to installation of the cap on the ground rod connection components. In some embodiments, the filler material is located in an airtight cavity until installation. In some such embodiments, a shrink-wrap material is placed around the body to make the cavity airtight. In other embodiments, the filler material is retained within at least a portion of the cap by an internal barrier that breaks as the cap is installed to allow the filler material to flow around the components.

26 Claims, 6 Drawing Sheets

(56) References Cited

U.S. PATENT DOCUMENTS

| | | | | |
|---|---|---|---|---|
| 7,341,475 | B2 | 3/2008 | Rivers | |
| 7,462,776 | B1 | 12/2008 | Carpenter, Jr. et al. | |
| 7,591,656 | B1 * | 9/2009 | Gretz | H01R 4/36 439/108 |
| 7,732,707 | B2 | 6/2010 | Kim | |
| 7,763,801 | B2 | 7/2010 | Hiner | |
| 7,988,503 | B2 * | 8/2011 | King, Jr. | H01R 4/36 439/521 |
| 2005/0085111 | A1 * | 4/2005 | Clark | H01R 4/60 439/100 |
| 2005/0178003 | A1 * | 8/2005 | Torii | H01R 13/5216 29/856 |
| 2010/0086266 | A1 * | 4/2010 | Marcouiller | G02B 6/2558 385/99 |
| 2010/0108374 | A1 | 5/2010 | Korcz et al. | |

* cited by examiner

ELECTRICAL GROUND ROD CAP

CROSS-REFERENCE TO RELATED APPLICATIONS

This application is a continuation-in-part of co-pending U.S. Non-provisional application Ser. No. 13/367,368, filed Feb. 6, 2012, which claims priority to U.S. Provisional Patent Application Ser. No. 61/439,561, filed Feb. 4, 2011, the entire disclosures of which are incorporated herein by reference.

FIELD OF THE INVENTION

The present invention relates generally to electrical conductors. More particularly, the present invention relates to a cap for an electrical ground rod.

BACKGROUND OF THE INVENTION

In electrical, telecommunications, in-ground fencing, and other industries, a ground rod is often used to establish a reference voltage, provide an electrical return, and/or protect various devices from damage due to lightning or static electricity. In many instances, the ground rod is driven into the earth until only a relatively small length of the ground rod remains above the earth. A ground rod clamp is then connected to the portion of the rod that remains above the earth. Finally, a ground wire connects the device/system being energized to the ground rod clamp, thereby completing the electrical circuit.

Exposure of the ground rod to the elements often cause the portion of the rod above and below the ground (or underwater, if applicable) to corrode, decreasing and/or preventing the flow of energy through the ground rod. This can be dangerous and also reduces efficiency. Prior art ground rod caps have been designed to reduce exposure of the point of connection between the ground rod and the ground wire to the elements, however, none provide a high degree of moisture resistance. Instead, most existing ground rod caps function merely as a cover to deflect moisture from one or more directions, but still leave the connection at least partially exposed to moisture entry. Such caps are not particularly well suited for situations in which the ground rod is intended to be submerged in water, such as in in-ground fencing systems located along bodies of water. In such applications, a ground rod is often located in the water. Therefore, it would be beneficial to provide a ground rod cap that provides a higher degree of moisture resistance and/or waterproofing and/or other protection from the elements for the ground rod connection; a ground rod cap that provides an improved or stabilized and/or electrically insulated connection for the ground wire/ground rod/clamp; and/or a ground rod cap that provides improvements over prior art caps and/or provides desirable features that is easier than prior art caps to install.

SUMMARY OF THE INVENTION

The present invention comprises a ground rod cap that includes a body including an inner cavity, a filler material, and a barrier holding the filler material within the cavity.

The instant invention provides a moisture resistant, and in some embodiments, waterproof, ground rod cap. More particularly, the cap of the instant invention seals the ground rod connection (i.e. the connection between the ground rod and ground wire, typically including a clamp to clamp the wire to the rod) to make it water-resistant. The ground rod cap of the instant invention provides a higher degree of moisture resistance, waterproofing, and/or other protection from the elements for the ground rod connection than convention ground rod caps. The ground rod cap of the instant invention also provides an improved or stabilized and/or electrically insulated connection for the ground wire/ground rod/clamp. The ground rod cap of the instant invention further provides improvements over prior art caps and/or provides desirable features of conventional caps in a manner that provides a cap that is easier than prior art caps to install.

The body of the cap of the instant invention fits around the ground rod, ground rod clamp and ground wire at the point of connection of those components. The ground rod and ground wire extend through one or more openings in the assembly for location of the rod in the earth and connection of the wire to the device/system being energized. The filler material (such as sealant or other suitable material) is located within the cap to increase the moisture resistance of, and in some embodiments, make waterproof, the assembly. In some embodiments, the filler material also acts to stabilize the connection between ground rod/wire/clamp by helping to support the connection. In some embodiments the filler material also acts to electrically insulate the ground rod/wire/clamp connection.

In some embodiments the filler material is located within the body of the cap prior to installation of the cap to the ground rod connection. In some such embodiments the filler material is located within the body of the cap during manufacture of the cap. In other such embodiments, the filler material is located within the body of the cap at the time of installation of the cap to the ground rod connection. In some embodiments the filler material is located within the body of the cap after installation of the cap to the ground rod connection.

In some embodiments in which the filler material is located within the body of the cap during manufacture of the cap, the barrier holds the filler material within the cavity of the body until the cap is installed. In some such embodiments, the barrier is a breakable barrier configured to break and expose said filler material to the connection component(s) (i.e. ground rod, wire and/or clamp) as the connection component(s) is/are positioned within the cavity. In some embodiments, the breakable barrier comprises a film that extends across one or more openings to the cavity in the cap body. In some embodiments, features such as retaining flanges or support flanges are included for adhesion or sealing of the barrier to the body. In other embodiments, the film extends over and/or around the edge of the opening(s) of the cavity and is sealed or adhered at that point. In other embodiments, the breakable barrier comprises a pouch in which the filler material is located and then placed into the cavity. In some such embodiments, the pouch is similar to a breast implant. In some embodiments, the pouch is glued or otherwise attached to an interior surface of the cavity.

In some embodiments in which the filler material is located within the body of the cap at the time of installation or after installation of the cap to the connection component(s), as well as in some embodiments in which the filler material is located within the body of the cap during manufacture of the cap, the barrier comprises a lid that mates with the body to close an opening to said cavity. In embodiments in which the filler material is located within the body of the cap at the time of installation or after installation of the cap to the connection component(s), the lid aids in keeping the filler material in the cavity and around the ground rod connection after installation. In embodiments in which the filler material is located within the body of the cap during manufacture, the lid acts to hold the filler material within the body of the cap until installation and also aids in in keeping the filler material in the cavity and around the ground rod connection after installation. In some embodiments, the lid itself includes an internal cavity in which filler material is located. In other embodiments, the lid is generally flat. In some embodiments, the lid is hingedly connected to the body.

In some embodiments in which a lid is included as a second body portion, an additional barrier is included that is associated with the body of the ground rod cap to hold the filler material within the cavity. In embodiments in which the lid itself includes an internal cavity, the filler material may be located in one or both body portions. If the filler material is located in both body portions, two separate barriers may be included to hold the filler material within the cavities.

In some embodiments, the barrier is made of a generally easily breakable material that is configured to break and expose the filler material to the ground rod connection component(s) as the connection component(s) is/are positioned within the cavity of the cap.

In some embodiments, the body of the cap includes a hole extending into said cavity for placement of a ground rod. In other embodiments, the ground rod cap further includes a channel extending into the cavity for placement of a wire. In some embodiments, one hole functions both for placement of the rod and placement of the wire.

In some embodiments, the barrier creates an airtight state within the cavity. This is particularly useful for embodiments in which the filler material is located within the cavity during manufacture. This is even more particularly useful in embodiments in which the filler material is a sealant material (such as silicone) that changes from a liquid state to a hardened or generally solid or semi-solid state when exposed to air. In some such embodiments, the barrier comprises a shrink-wrap that is placed around the body. In some embodiments, the filler material is maintained in a fluid state within the cavity while the barrier is airtight, and the filler material changes to a generally solid or semi-solid state after said airtight state of said barrier is broken.

In some embodiments, in which the body includes a lid/barrier, the lid functions to keep the cavity airtight.

In some embodiments, in which filler materials may be maintained in a fluid state in air, the lid or other separate barrier is closed and/or sealed to hold the filler material, and opened to allow the filler material to flow around the connection and then a separate reaction is initiated (such as a separate chemical reaction) to change the filler material to a solid or semi-solid or otherwise hardened state.

In operation, a ground wire is positioned in contact with a ground rod, the ground rod cap of the instant invention is placed over the point of connection of the ground rod and ground wire such that the connection point is within the cavity of the body of the cap. The point of connection is then exposed to the filler material and the filler material surrounds the point of connection. In some embodiments, the filler material is held within the cavity with a breakable barrier, and the breakable barrier is broken during placement of the cap on the connection point to expose the filler material to the connection point. In some embodiments the filler material changes from a fluid state to a generally solid or semi-solid state after the filler material is exposed to the connection point. In some embodiments this is a result of the filler material being exposed to air. In other embodiments this is a result of some other reaction such as a chemical or thermally activated reaction, depending upon the filler material utilized. In some embodiments, the filler material is located within the cavity after installation of the cap to the connection point. In some such embodiments, a barrier of the cap, such as a lid or body portion, aids in holding the filler material within the cap after installation.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1A:
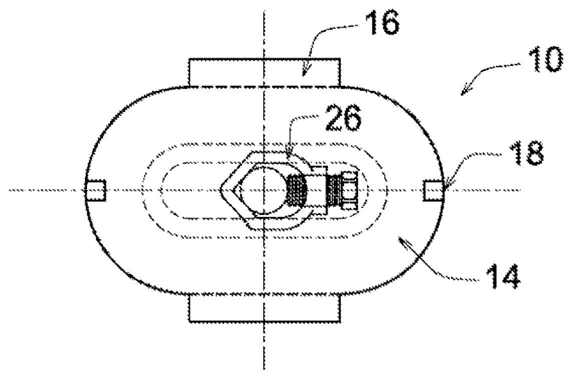
FIGS. 1*a, b, c* and *d* are top, side, end and bottom views, respectively, of a ground rod cap of a first embodiment of the instant invention.
Figure 1B:
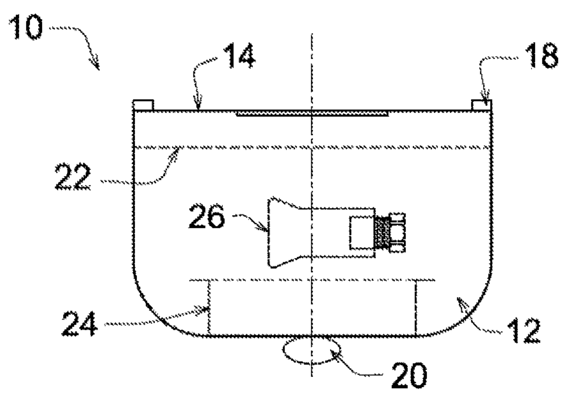
Figure 1C:
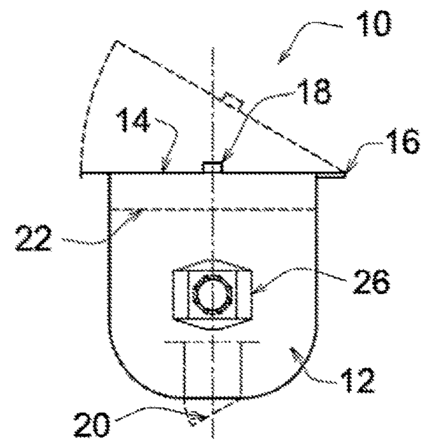
Figure 1D:
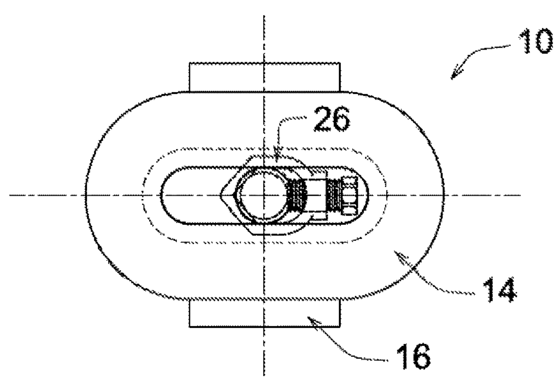
Figure 5A:
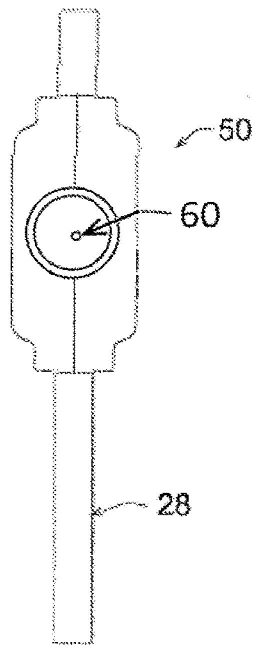
FIGS. 5*a* and 5*b* are side and front views, respectively, of a ground rod cap of a fifth embodiment of the instant invention.
Figure 5B:
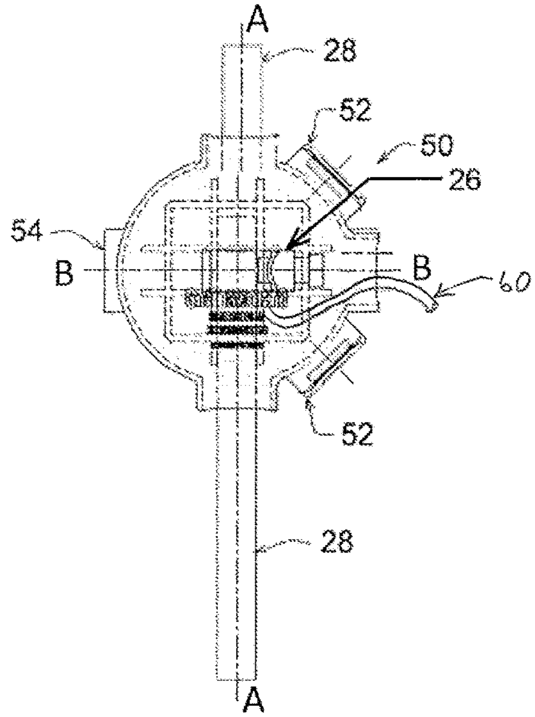
Figure 5C:
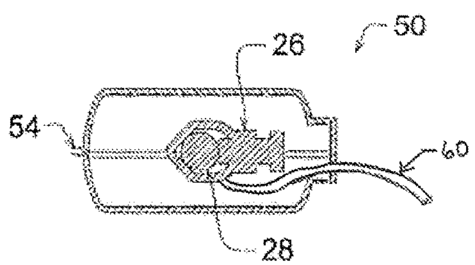
FIGS. 5*c* and 5*d* are sectional views taken along lines A-A and B-B of FIG. 5*b*, respectively.
Figure 5D:
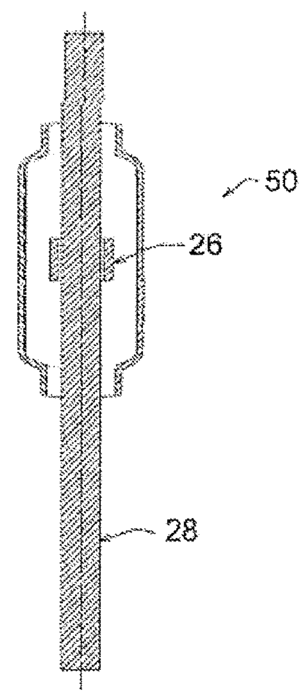

FIG. 1 shows top, side and bottom views of a ground rod cap 10 of a first embodiment of the instant invention. The cap 10 in the embodiment shown includes a body 12 and a removable lid 14 connected to the body 12. In the embodiment shown, the body 12 and lid 14 are made of a plastic material; notwithstanding, it will be appreciated that other suitable materials will be apparent to those of ordinary skill in the art. In the embodiment shown in FIG. 1, the lid 14 is connected via a living hinge 16. It will be appreciated that alternative connections may be utilized without departing from the spirit and scope of the instant invention, including but not limited to alternative hinge connections or separable connections such as through the use of external threads on the body 12 and internal thread on the lid 14. The hinge connection in the embodiment shown allows for the inclusion of the wire channel 18, which allows a ground wire 60 (see FIG. 5) to easily extend out of the cap 10.

The cap 10 of FIG. 1 further includes a punch out hole 20 at the bottom end of the body 12, opposing the lid 14. The punch out 20 shown includes perforated or weakened portions of material of diameters ranging from ½ inch to ¾ inch. It will be appreciated that punch outs 20 of other diameters may be utilized, as well as alternative structural arrangements for providing holes of various diameters (including but not limited to an "x" shaped cutout similar to a straw hole in a drinking cup lid). In addition, it will be appreciated that a fixed diameter hole may also be utilized without departing from the spirit and scope of the instant invention.

Figure 4A:
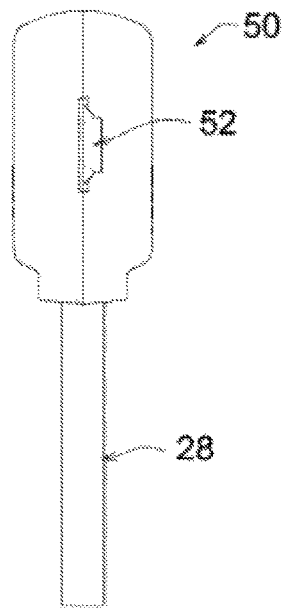
FIGS. 4*a, b, c* are side, front and bottom views, respectively, of a ground rod cap of a fourth embodiment of the instant invention.
Figure 4B:
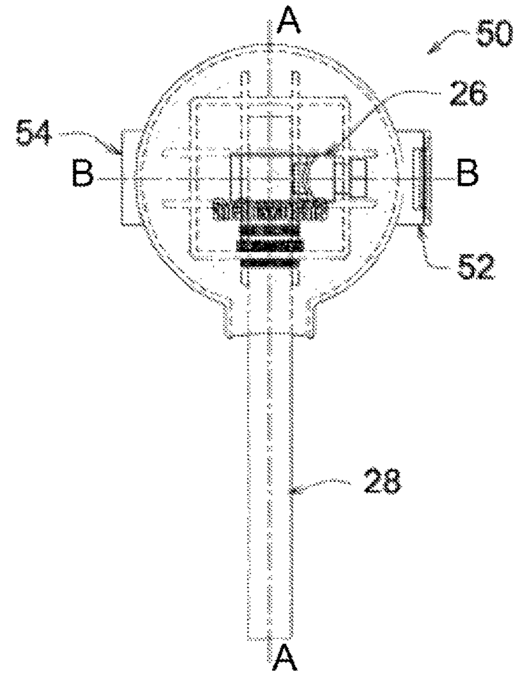
FIG. 4*d* is a sectional view taken along line A-A of FIG. 4*b.*
FIG. 4*e* is a sectional view taken along line B-B of FIG. 4*b.*
FIG. 4*f* is a detail view of a hinge connecting to halves of the cap body taken from FIG. 4*e.*
FIG. 4*g* is a detail view of a clamp releasably connecting two halves of the cap body taken from FIG. 4*d.*
FIG. 4*h* is a detail view of the clamp taken from FIG. 4*e.*
Figure 4C:
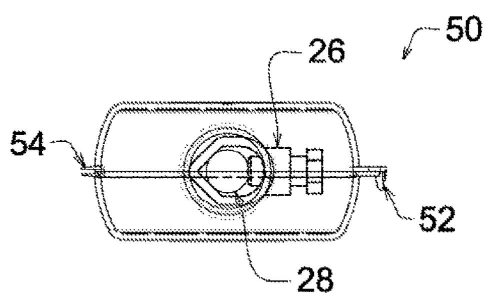
Figure 4D:
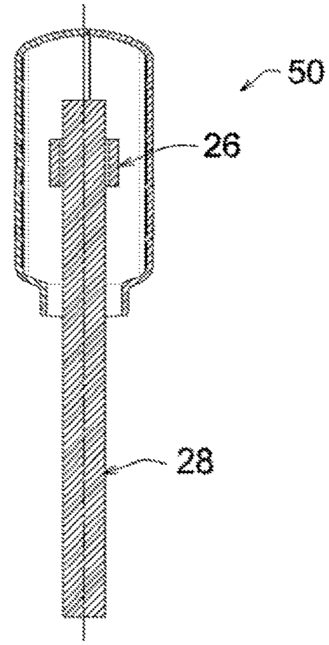
Figure 4E:
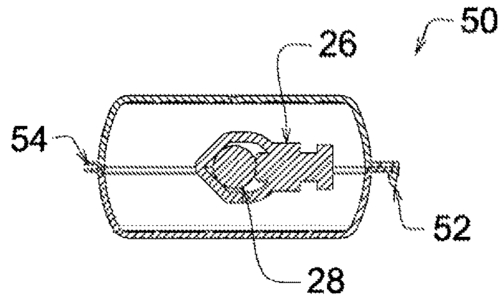
Figure 4F:
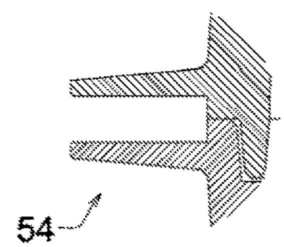
Figure 4G:
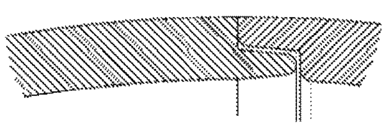
Figure 4H:
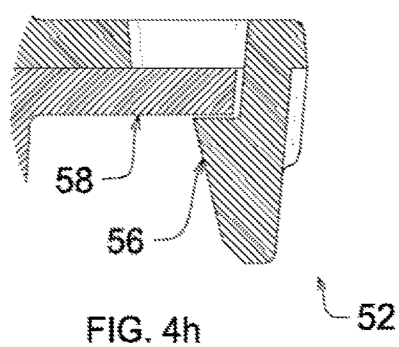

A filler or sealant material (not shown) is included in the cap 10. In a preferred embodiment, the filler or sealant is included in the cap 10 prior to placement on a ground rod 28 (see FIG. 4). In some embodiments, the filler or sealant is included during manufacturing of the cap 10. In some such embodiments, the filler or sealant is designed to harden when it is exposed to air. In some such embodiments, a plastic or other suitable barrier 22 is included to keep the sealant air tight. In other such embodiments, the lid 14 may be sealed to the body 12 to keep the sealant air tight.

In the embodiment shown in FIG. 1, the barrier 22 extends across the top of restraint flanges 24. In addition, another barrier 22 is included on the opposing end below the lid 14. The barrier 22 is easily breakable during installation.

In operation, the ground rod 28 (see FIG. 4) is punched through the knock-out hole 20. This can be done either before or after the ground rod 28 is driven into the ground (if the rod is driven into the ground). If done before the rod 28 is driven into the ground, a ground rod clamp 26 and the ground wire 60 can be attached to the ground rod 28 before the cap 10 is installed. If done after the ground rod 28 is driven into the ground, the cap 10 is placed on the ground rod 28, and the ground rod clamp 26 and the ground wire 60 are installed in the sealing material. Then the lid 14 is closed to seal the assembly.

Figure 2A:
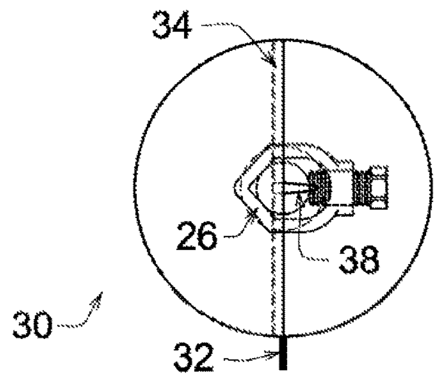
FIGS. 2*a, b, c* are top, side and bottom views, respectively, of a ground rod cap of a second embodiment of the instant invention.
Figure 2B:
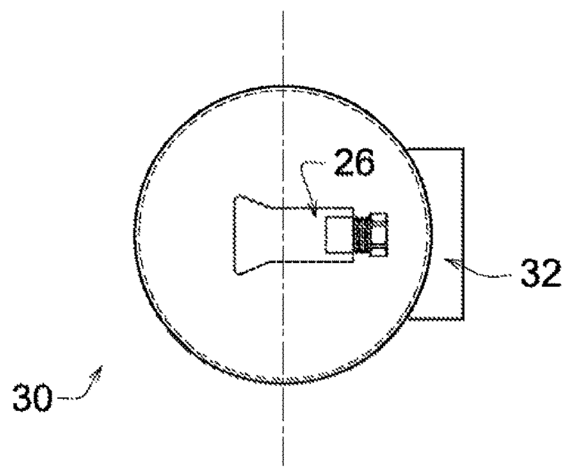
FIG. 2*d* is a partial detail view of the top of the ground rod cap of FIG. 2*a.*
Figure 2D:
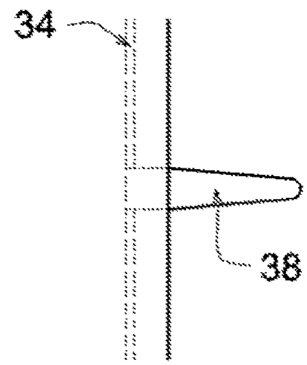
Figure 2C:
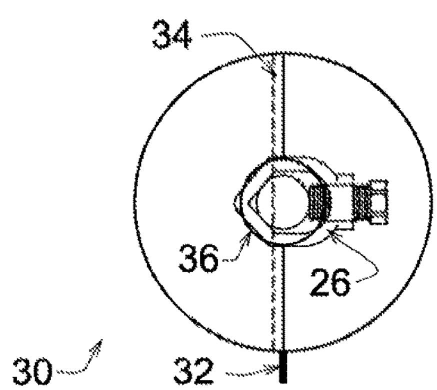

FIG. 2 shows top, side and bottom views of a ground rod cap 30 of a second embodiment of the instant invention. The cap 30 shown in FIG. 2 is generally spherical in shape and includes two halves that are connectable together. In the embodiment shown, the two halves are connected together via a hinge 32; however, it will be appreciated that alternative connections (including but not limited to no hinge) may be utilized without departing from the spirit and scope of the instant invention. In the embodiment shown, one half includes a continuous clip edge or channel 34, similar to a Tupperware or other container lid connection. The other half includes a generally flat edge (not shown) that fits within the channel 34. This allows a secure connection of the two halves. It will be appreciated that alternative connections may be utilized without departing from the spirit and scope of the instant invention.

In the embodiment shown in FIG. 2, a 1 inch diameter hole 36 is included on the bottom of the cap to accommodate a ground rod 28 (see FIG. 4) up to 1 inch in diameter. Nevertheless, it will be appreciated that other diameter holes may be utilized without departing from the spirit and scope of the instant invention. In addition, it will be appreciated that knockouts or other structures may be utilized as well.

The embodiment shown in FIG. 2 also includes a wire channel 38 located at the top of the ground rod cap 30. Nevertheless, the channel 38 may be located at other positions without departing from the spirit and scope of the instant invention. In addition, it will be appreciated that the hole 36 for the ground rod 28 may also accommodate a ground wire 60 (see FIG. 5), either through a larger diameter for the hole, or through a separate channel incorporated into the hole. The cap 30 of this embodiment allows for the cap 30 to be easily installed onto the ground rod 28 after the clamp 26 and wire 60 are installed and after the rod 28 is driven into the ground. The two halves are placed around the rod 28 and closed together. A sealant material (not shown) is located within the two halves and contained by a barrier (not shown). The barrier is made from breakable plastic or other breakable sealing material. As the halves are closed around the rod 28 and clamp 26, the barrier is broken to expose the sealant.

In one embodiment of a no hinge connection cap 30 similar to that shown in FIG. 2, one half is sized to fit telescopically within the other half. In such an embodiment, the size of the cap 30 can be selectively increased and decreased by either lessening or increasing, respectively, the amount the one half is inserted into the other half. In such an embodiment, increasing or decreasing the size of the cap 30 will simultaneously increase and decrease the size of the hole 36 for the ground rod 28. In some embodiments, the hole 36 within the cap 30 tapers outward toward the edge of each half to better accommodate varying rod diameters.

In other embodiments of the invention, a single piece ground cap 30 is utilized. In one such embodiment, a semi-spherical cap 30 similar to one half of the cap shown in FIG. 2 is utilized. In that embodiment, the cap 30 includes a notch (not shown) for the rod 28 and a breakable plastic to hold a sealing material within the cap 30. In operation, the cap 30 is turned sideways, with the opening facing the ground rod 28 and clamp 26, and the rod 28 and clamp 26 are slid into the notch pressing against the breakable plastic. The cap 30 is rotated about the rod 28 and clamp 26 with the opening facing approximately 90 degrees to the starting orientation. The pressing of the clamp 26 against the breakable plastic as the rod 28 is slid into the notch, along with increased pressure as the cap 30 is rotated, results in the plastic breaking and exposing the sealant material, and results in the sealant material flowing around the clamp 26 and rod 28.

Figure 3A:
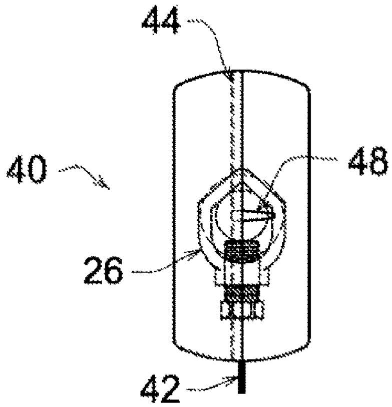
FIGS. 3*a, b, c* are top, side and bottom views, respectively, of a ground rod cap of a third embodiment of the instant invention.
Figure 3B:
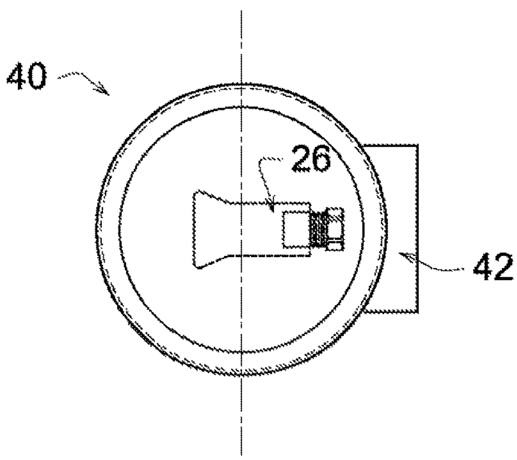
FIG. 3*d* is a partial detail view of the top of the ground rod cap of FIG. 3*a.*
Figure 3D:
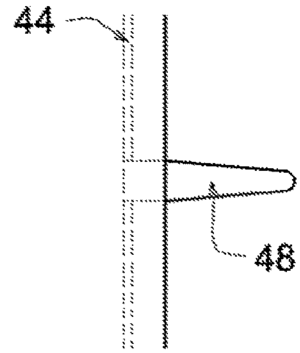
Figure 3C:
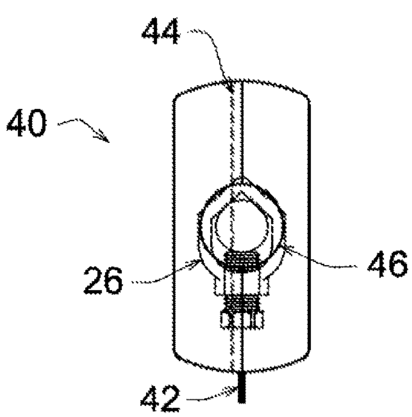

FIG. 3 shows top, side and bottom views of a ground rod cap 40 of another embodiment of the instant invention similar to that of FIG. 2. The cap 40 shown in FIG. 3 is generally cylindrical in shape and includes two halves that are connectable together. In the embodiment shown, the two halves are connected together via a hinge 42 (such as a living hinge); however, it will be appreciated that alternative connections (including but not limited to no hinge) may be utilized without departing from the spirit and scope of the instant invention. In the embodiment shown, one half includes a continuous clip edge or channel 44, similar to a Tupperware or other container lid connection. The other half includes a generally flat edge (not shown) that fits within the channel. This allows a secure connection of the two halves. It will be appreciated that alternative connections may be utilized without departing from the spirit and scope of the instant invention.

In the embodiment shown in FIG. 3, a 1 inch diameter hole 46 is included on the bottom of the cap to accommodate a ground rod 28 (see FIG. 4) up to 1 inch in diameter. Nevertheless, it will be appreciated that other diameter holes may be utilized without departing from the spirit and scope of the instant invention. In addition, it will be appreciated that knockouts or other structures may be utilized as well.

The embodiment shown in FIG. 3 also includes a wire channel 48 located at the top of the ground rod cap 30. Nevertheless, the channel 48 may be located at other positions without departing from the spirit and scope of the instant invention. In addition, it will be appreciated that the hole for the ground rod 28 may also accommodate a ground wire 60 (see FIG. 5), either through a larger diameter for the hole, or through a separate channel incorporated into the hole. The cap 40 of this embodiment allows for the cap 40 to be easily installed onto the ground rod 28 after the clamp 26 and wire 60 are installed and after the rod 28 is driven into the ground. The two halves are placed around the rod 28 and closed together. A sealant material (not shown) is located within the two halves and contained by a barrier (not shown). The barrier is made from breakable plastic or other breakable sealing material. As the halves are closed around the rod 28 and clamp 26, the barrier is broken to expose the sealant.

FIG. 4 shows front, side and bottom views of a ground rod cap 50 of another embodiment of the instant invention similar to that of FIG. 3. The primary difference between the embodiment of FIG. 3 and FIG. 4 is that the cap 50 of FIG. 4 does not include a separate wire channel (the rod hole functions as the wire channel), and the cap 50 of FIG. 4 utilizes several clip/clamp features 52 to hold the two halves of the cap 50 together.

Each half of the cap 50 defines a primary opening. The edge of each primary opening includes a continuous lip that mates together with the lip of the opposing half of the cap 50. Neither lip includes a channel. Instead, one or more clamps 52, combined with the hinge 54, hold the two halves together.

In the embodiment shown in FIG. 4, the clamp 52 includes a tongue 56 that extends generally along the outer surface of one half of the cap body away from the opening, and towards the other half of the cap body. The opposing half of the cap body includes a ridge 58 protruding generally transverse to the surface of the cap body for frictional engagement with the tongue 56. The tongue 56 snap-fits over the ridge 58 for tight engagement.

FIG. 5 shows front and side views of a ground rod cap 50 of another embodiment of the instant invention similar to that of FIG. 4. The primary difference between the embodiment of FIG. 4 and FIG. 5 is that the cap 50 of FIG. 5 includes more than one punch out hole 20 (See FIG. 1) and more than one clip/clamp features 52. Specifically, the embodiment shown in FIG. 5 includes three punch out holes 20 and two clamps 52. A first punch out hole 20 is positioned at a bottom of the cap 10, a second punch out hole 20 is positioned on a side of the cap 10, and a third punch out hole 20 is positioned at a top of the cap 10. A first clamp 52 is positioned between the first and second punch out holes 20 and a second clamp 52 is positioned between the second and third punch out holes 20. Additionally, a hinge 54 is positioned between the first and third punch out holes 20 on a side of the cap 10 opposite the second punch out hole 20. In this way, the hinge 54 and the first and second clamps 52 are capable of retaining the cap 10 in a closed configuration when a first half of the cap 10 is coupled to a second half of the cap 10. It will be appreciated that in other embodiments alternative configurations will be utilized without departing from the spirit and scope of the instant invention.

In some embodiments, as shown in FIG. 5, the first and third punch out holes 20 are aligned such that a ground rod 28 is capable of being received simultaneously by both the first and third punch out holes 20 when the cap 10 is in a closed configuration. In this way, a ground rod clamp 26 need not be positioned at a top end of the ground rod 28 for the ground rod clamp 26 to be positioned in an interior area of the cap 10 when the cap 10 is in a closed configuration. In some such embodiments, the second punch out hole 20 is configured to receive a ground wire 60. In other such embodiments, the ground wire 60 and/or the ground rod 28 are capable of being received by any other punch out hole 20 and/or combination of punch out holes 20.

It will be appreciated that although the present invention is suited for providing superior protection for ground rod clamps, the present invention is also capable of providing superior protection for a variety of connections and connectors. For instance, in some embodiments the present invention is capable of being used to protect a guy wire connection. It will be appreciated that in still other embodiments the ground rod cap 10 will also be employed to protect still other structural and non-structural features, including other structural and non-structural connections, without departing from the spirit and scope of the instant invention.

It will be appreciated that a variety of different filler materials may be utilized in connection with the cap of the instant invention. In some embodiments, the filler material is a sealant. In some such embodiments a silicone is utilized. In some embodiments the silicone is an rtv silicone, such as GT-3100. In some embodiments the silicone includes dielectric properties. In some embodiments, a dielectric grease is utilized. In some preferred embodiments the filler material is a material that acts as a fluid. Such embodiments include filler materials such as liquids, semi-solids, particulates, gels, rubber, closed or open cell expandable or nonexpendable foams, and the like. In some embodiments, the filler material is in a fluid state prior to and during installation of the cap, and changes to a solid or semi-solid or hardened state after/during installation of the cap. In some embodiments the change from fluid to non-fluid state is the result of exposure of the filler material to air. In other embodiments, it is the result of a chemical, heat-activated, or other reaction. It will be appreciated that in some embodiments, the filler material will not change from a fluid to non-fluid state. In some embodiments, the filler material may remain in a single state at all times, such as in only a fluid state or only a non-fluid state.

In some embodiments, grooves are added to the inside surface of the body of the cap to increase the filler's (or in the case of sealant, the sealant's) adhesion to the plastic or other material of the body.

In some embodiments, the filler material of the instant invention provides water-resistant connection by sealing the connection (i.e. ground rod/clamp/wire connection) to make it water-resistant. In other embodiments, the connection is strengthened or stabilized by the filler material providing support for the connection. In some embodiments, particularly when dielectric material is utilized, the filler material electrically insulates the ground rod connection.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

It will be appreciated that alternative embodiments of the instant invention include combinations of one or more features of one or more embodiments of the instant invention. For example, some embodiments of the instant invention may include the sealant material of one of the embodiments discussed herein and the barrier of another embodiment discussed herein. As another example, the material in which one embodiment is manufactured may be utilized in connection with manufacturing any of the other embodiments.

Although the foregoing detailed description of the present invention has been described by reference to exemplary embodiments, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A protective cap comprising:

a body including an inner cavity; and a filler material located within said cavity, wherein said filler material changes from a generally liquid state to a generally solid or semi-solid state within said cavity;

wherein said body defines a first opening in communication with said inner cavity of said body, said first opening being oriented perpendicular to a first axis and being configured for selectively receiving a first portion of a first elongate member, the first portion of the first elongate member extending substantially along the first axis, wherein said inner cavity includes a diameter substantially greater than 1 inches to accommodate a connection component coupled to the first elongate member, wherein said first opening is sized so as to prevent the connection component from passing through said first opening when the connection component is coupled to the first elongate member, and wherein said body defines a second opening in communication with said inner cavity of said body, said second opening being oriented perpendicular to a second axis and being configured for selectively receiving a first portion of a second elongate member, the first portion of the second elongate member extending substantially along the second axis, wherein the second axis is angled away from the first axis, wherein the first elongate member is a ground rod having a diameter of at least 0.5 inches, wherein the connection component is a ground rod clamp, wherein the second elongate member is a ground wire, and wherein the connection component includes a main section for surrounding the ground rod and a bolt for electrically securing the ground wire to the ground rod.

2. The protective cap as claimed in claim 1 further including a breakable barrier configured to break, thereby exposing said filler material to the connection component as the connection component is positioned within said inner cavity.

3. The protective cap as claimed in claim 1 further comprising a lid coupled to said body and moveable between an open configuration and a closed configuration, wherein said body defines a third opening opposed to said first opening, said lid being in communication with said third opening when said lid is in the closed configuration such that said lid prevents air from entering or exiting said inner cavity through said third opening when said lid is in the closed configuration, said third opening being configured so as to allow the connection component to be moved into said inner cavity of said body by sliding at least one of the connection component and the protective cap along the first axis.

4. The protective cap as claimed in claim 3 wherein said lid includes an internal cavity in which said filler material is located.

5. The protective cap as claimed in claim 3 wherein said lid is hingedly connected to said body.

6. The protective cap as claimed in claim 1 wherein said body includes a first body portion and a second body portion that mates with said first body portion.

7. The protective cap as claimed in claim 6 wherein said body portions are connected together via a hinge that is located in a plane that is spaced apart from the first axis; and wherein said first opening is located generally at a bottom of the protective cap and said hinge is located generally along a side of the protective cap at a location generally higher than said first opening.

8. The protective cap as claimed in claim 6 wherein said filler material is held within a cavity of at least one of said first and second body portions by a barrier.

9. The protective cap as claimed in claim 8 wherein said barrier is configured to break and expose said filler material to the connection component as the connection component is positioned within said cavity.

10. The protective cap as claimed in claim 6 wherein said cavity is at least partially located in said first body portion, and wherein said second body portion is moveable between an open configuration and a closed configuration such that the connection component may be placed within said cavity when said second body portion is in the open configuration and retained within said cavity when said second body portion is in the closed configuration.

11. The protective cap as claimed in claim 1 further including a barrier that creates an airtight state within said cavity.

12. The protective cap as claimed in claim 11 wherein said barrier comprises a shrink-wrap around said body.

13. The protective cap as claimed in claim 11 wherein said filler material is maintained in a fluid state within said cavity while said barrier is airtight, and wherein said filler material changes to a generally solid or semi-solid state after said airtight state of said barrier is broken.

14. The protective cap as claimed in claim 13 wherein said filler material is a silicone material.

15. The protective cap as claimed in claim 1 further including a barrier, and wherein said filler material is maintained in a fluid state within said cavity while said barrier is closed, and wherein said filler material changes to a generally solid or semi-solid state when said barrier is open.

16. The protective cap as claimed in claim 15 wherein said change from a fluid state results from exposure of said filler material to air.

17. The protective cap as claimed in claim 15 wherein said filler material is a particulate.

18. The protective cap as claimed in claim 1 wherein the second axis is substantially perpendicular to the first axis.

19. A method of reducing the risk of corrosion at a point of connection between a connection component and a first elongate member, the method comprising the steps of:

moving a second body member of a protective cap away from a first body member of the protective cap such that the protective cap is in an open configuration;

positioning the protective cap around the connection component; and moving the second body member of the protective cap towards the first body member of the protective cap until the protective cap is in a closed configuration such that the connection component is positioned entirely within an inner cavity of the protective cap;

wherein a first portion of the first elongate member extends into the inner cavity of the protective cap through a first opening of the protective cap, the first opening being oriented perpendicular to a first axis;

wherein a first portion of a second elongate member extends out of the inner cavity of the protective cap through a second opening of the protective cap, the second opening being perpendicular to a second axis;

wherein said cavity includes a diameter substantially greater than 1 inches to accommodate said connection component;

wherein a filler material in a generally liquid state is located within the inner cavity of the protective cap;

wherein said filler material changes from the generally liquid state to a generally solid or semi-solid state within said cavity;

wherein said first opening is sized so as to prevent said connection component from passing through said first opening when said connection component is coupled to said elongate member;

wherein the first portion of the first elongate member extends substantially along the first axis, wherein the first portion of the second elongate member extends substantially along the second axis, and wherein the second axis is angled away from the first axis, wherein the first elongate member is a ground rod having a diameter of at least 0.5 inches, wherein the connection component is a ground rod clamp, wherein the second elongate member is a ground wire, and wherein the connection component includes a main section for surrounding the ground rod and a bolt for electrically securing the ground wire to the ground rod.

20. The method as claimed in claim 19 further comprising the steps of:

holding the filler material within the cavity with a breakable barrier; and breaking the breakable barrier during said positioning step to expose the filler material within the cavity to the point of connection.

21. The method as claimed in claim 19 wherein the two body members are connected together via a hinge that is located in a plane that is spaced apart from the first axis; and wherein said first opening is located generally at a bottom of the protective cap and said hinge is located generally along a side of the protective cap at a location generally higher than said first opening.

22. The method as claimed in claim 19 wherein the second axis is substantially perpendicular to the first axis.

23. The method as claimed in claim 19 wherein a second portion of the first elongate member extends out of the inner cavity of the protective cap through a third opening of the protective cap, the third opening being opposed to the first opening.

24. A method of reducing the risk of corrosion of a grounding connection connecting a grounding wire to and a grounding electrode, the method comprising the steps of:

positioning the grounding connection on the grounding electrode;

applying a filler material in a generally liquid state about the grounding connection; and positioning a body around said grounding connection, said body includi a first opening through which a first portion of said grounding electrode extends, the first opening being oriented perpendicular to a first axis;

wherein said first opening is sized so as to prevent said grounding connection from passing through said first opening when said grounding connection is coupled to said grounding electrode;

wherein said filler material changes from the generally liquid state to a generally solid or semi-solid state after said applying step, wherein a first portion of the grounding wire extends through a second opening of said body, the second opening being oriented perpendicular to a second axis, wherein the first portion of the grounding electrode extends substantially along the first axis, wherein the first portion of the grounding wire extends substantially along the second axis, wherein the second axis is angled away from the first axis, wherein the grounding electrode is a ground rod having a diameter of at least 0.5 inches, wherein the grounding connection is a ground rod clamp, and wherein the connection component includes a main section for surrounding the ground rod and a bolt for electrically securing the ground wire to the ground rod.

25. The method as claimed in claim 24 wherein the second axis is substantially perpendicular to the first axis.

26. The method as claimed in claim 24 wherein a second portion of the grounding electrode extends out of the inner cavity of the protective cap through a third opening of the protective cap, the third opening being opposed to the first opening.

* * * * *